April 8, 1952  H. E. FARNETT  2,592,019
WIRE-CUTTING MACHINE
Filed Oct. 30, 1947
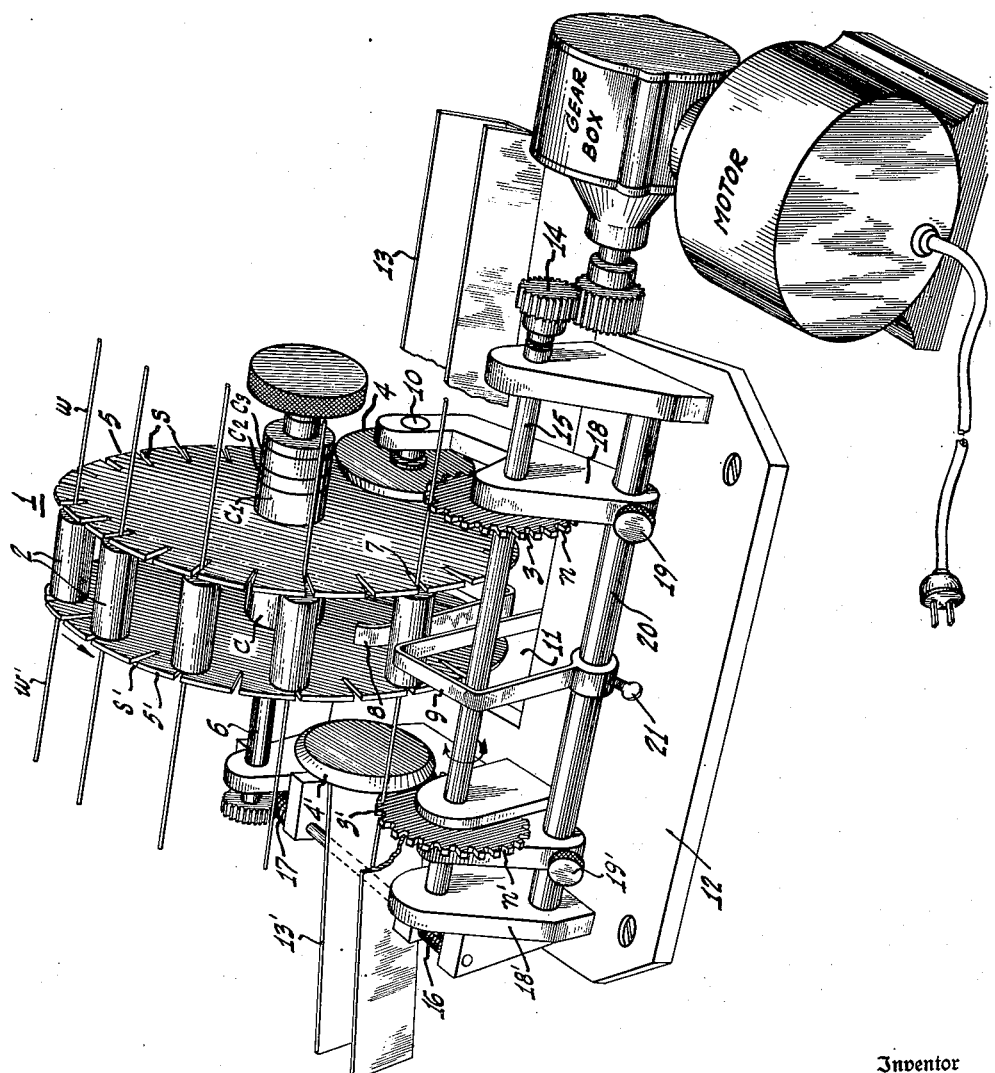
Inventor
HORACE E. FARNETT
By
Attorney Patented Apr. 8, 1952

2,592,019

UNITED STATES PATENT OFFICE 2,592,019

WIRE-CUTTING MACHINE

Horace E. Farnett, Crescent Park, N. J., assignor to Radio Corporation of America, a corporation of Delaware Application October 30, 1947, Serial No. 783,129

6 Claims. (Cl. 164—38)

1

This invention relates to improvements in wire-cutting machines and particularly to a machine for cutting the lead wires of resistors, fixed-capacitors and similar (i. e. relatively small) electrical components for use in the mass production of radio, television and like apparatus.

The logical and usual practice in the fabrication of small electrical components is to make the lead wires thereof long enough to permit them to be cut to any of the various lengths required for their installation in different circuits, or in chassis of different dimensions. The job of cutting the lead wires of a given component to the proper length has heretofore been assigned to the wireman responsible for the installation of that particular component. The cutting of the individual wires, as with a pair of pliers, is obviously a simple operation but becomes a time-consuming and expensive one when employed in the manufacture of radio sets and similar units by mass production methods.

Accordingly, the principal object of the present invention is to provide an automatic or semi-automatic machine for cutting the lead wires of electrical components to any desired length, and one which shall be capable of handling electrical components of various kinds and sizes.

As shown in perspective in the accompanying drawing the wire-cutting machine of the present invention consists of a slotted drum-like rotary conveyor, indicated generally at 1, which carries the capacitors 2 or other components whose lead wires $w$, $w'$ are to be cut to a shearing mechanism consisting of duplicate notched wheels 3, 3' and blades 4, 4'. The rotary conveyor 1 comprises two end-plates 5 and 5' spaced apart an adjustable distance on the shaft 6 by means of spacing collars C, $C^1$, $C^2$, $C^3$ to accommodate capacitors etc. of various body lengths. When, as here shown, the conveyor 1 rotates about a horziontal axis 6 the parts 2 are placed between the end plates 5—5' with their oppositely extending lead wires $w$, $w'$ projecting through the registered slots $s$, $s'$ adjacent to the "top" of the machine and are carried downwardly to a point whereat they are urged outwardly, by gravity, toward the open end of the slots at the periphery of the rotor, as indicated at 7. At this point (7) each part 2 is received in a channel defined by two guide bars 8 and 9, and the outwardly extending oppositely located lead-wires $w$, $w'$ of the said part are received, respectively, in the aligned notches $n$, $n'$ of the rotating shearing wheels 3 and 3'. The constantly rotating notched wheels 3, 3' carry the wires $w$, $w'$ rearwardly

2 through a short arc and urge them against the preferably beveled edges of the blades 4, 4' with sufficient force to sever the same. The circular blades 4, 4' are free to rotate on their stub shafts 10 hence a different portion of the blade will be presented to each wire. The movement of the conveyor 1 is continuous, hence subsequent to the shearing operation the capacitors 2 continue their outward and downward movement between the guide bars 8 and 9 until the wires thereon pass out of the slots $s$, $s'$ in the conveyor, whereupon, the said components 2 drop through an aperture 11 in the base 12 of the machine into a stock box, not shown. The cut-off ends of the wires $w$, $w'$ drop into troughs 13 and 13' which are slanted downwardly to carry the scrap away from the machine.

As above indicated the direction of rotation of the toothed shearing wheels 3, 3' is opposite to the direction of rotation of the conveyor 1. The driving force required to produce these different movements is shown as supplied by an electric motor which operates through a gear box and a pinion 14 to drive the shaft 15, upon which the wheels 3, 3' are mounted, in the clockwise direction (as viewed by an observer at the right of the drawing). This shaft 15, in turn operates through a left hand spiral 16 and a worm and gear 17 to drive the conveyor-shaft 6 (and hence the slotted discs 5 and 5' thereon) counterclockwise in synchronism with the wheelshaft 15.

Each notched wheel 3 (and 3') and the blades 4 (or 4') which is associated therewith are mounted upon a bracket 18 (18') for lateral movement to permit the adjustment in spacing which is required for cutting wires of different lengths. It will be understood that the notched wheels 3 and 3' are provided with splined bearings (not shown) to permit of such lateral movement on their driving shaft 15. A set screw 19 (19') on each of the brackets 18 (18') engages a stationary rod 20 and locks the bracket in the position in which it has been placed. Another set screw 21 on the rod 20 locks the guide bar 9 in register with the median plane of the rotatable conveyor 1.

It will now be apparent that the present invention provides an improved wire-cutting machine and one suitable for use in cutting the lead wires of electrical components of various sizes to any desired length encountered in the mass production of radio and similar units.

What is claimed is:

1. A machine for simultaneously cutting, to a desired length, the oppositely located outwardly extending lead wires of prefabricated electrical components, said machine comprising a rotary conveyor composed of a pair of rotatable members mounted in adjustably spaced relation for rotation about a common axis and having aligned slots in the peripheries thereof for receiving the oppositely extending lead wires of said electrical components when said components are placed in the space between said rotatable members, a pair of wheels mounted in adjustably spaced relation for rotation about an axis parallel to said first mentioned axis outside the arc of rotation of said rotatable members, said wheels having notches therein for engaging respective ones of said outwardly extending wires, and a blade mounted closely adjacent to the path of movement of each of said notched wheels for shearing said wires when said wires are urged against said blades upon rotation of said notched wheels, and means for rotating said rotatable members and said notched wheels in synchronism.

2. The invention as set forth in claim 1 and wherein adjustable guide means are provided for directing the movement of said electrical components during and subsequent to said shearing movement.

3. A wire cutting machine comprising a wheel having a plurality of circumferentially spaced notches in the periphery thereof within which the wires to be cut are separately seated for movement in an arc about the axis of rotation of the said wheel, a shearing member mounted closely adjacent to said wheel within the said arc of movement of said wires for sequentially applying shearing forces to said wires when said wires are urged thereagainst upon rotation of said wheel, and means comprising a rotary conveyor having an axis of rotation parallel to the axis of said notched wheel and outside the periphery of said wheel consisting of a pair of rotatable members mounted in adjustably spaced relation having aligned slots in the peripheries thereof for receiving the oppositely extending lead wires of electrical components, and from which said wires project into the path of movement of said notched wheel and wherein means are provided for rotating said conveyor and said notched wheel in synchronism.

4. A cutting machine comprising in combination a rotary conveyor composed of a pair of rotatable members mounted in adjustably spaced relation for rotation about a common axis and having aligned slots in the peripheries thereof for receiving the articles to be cut, a pair of wheels mounted in adjustably spaced relation for rotation about an axis parallel to said first mentioned axis, said wheels having notches therein for engaging said articles, a pair of blade wheels mounted closely adjacent to the path of movement of each of said notched wheels for shearing said wires, one notched wheel and one cutting wheel of each pair being mounted on a common carrier and means for rotating said rotatable members and said notched wheels in synchronism.

5. A cutting machine comprising in combination a rotary conveyor composed of rotatable members mounted in adjustably spaced relation for rotation about a common axis and having aligned slots in the peripheries thereof for receiving the articles to be cut, a pair of wheels mounted in adjustably spaced relation for rotation about an axis parallel to said first mentioned axis, the direction of rotation of said wheels being opposite to the direction of rotation of said rotary conveyor, said wheels having notches therein for engaging said articles to be cut, a pair of blade wheels mounted closely adjacent to the path of movement of each of said notched wheels for shearing said articles, and means for rotating said rotatable members and said notched wheels in synchronism.

6. A cutting machine comprising in combination a rotary conveyor composed of rotatable members mounted in adjustably spaced relation for rotation about a common axis and having aligned slots in the peripheries thereof for receiving the articles to be cut, a pair of wheels mounted in adjustably spaced relation for rotation about an axis parallel to said first mentioned axis, the direction of rotation of said wheels being opposite to the direction of rotation of said rotary conveyor, said wheels having notches therein for engaging said articles to be cut, a pair of blade wheels mounted closely adjacent to the path of movement of each of said notched wheels for shearing said articles, one notched wheel and one cutting wheel of each pair being mounted on a common carrier whereby adjustment of the position of the notched wheel automatically adjusts the position of the cutting wheel, and means for rotating said rotatable members and said notched wheels in synchronism.

HORACE E. FARNETT.

REFERENCES CITED

The following references are of record in the file of this patent:

UNITED STATES PATENTS

| Number | Name | Date |
|---|---|---|
| 839,121 | Dean | Dec. 25, 1906 |
| 923,552 | Mill | June 1, 1909 |
| 1,478,683 | Stevens | Dec. 25, 1923 |
| 1,641,222 | Foisy | Sept. 6, 1927 |
| 1,951,841 | Roberts | Mar. 20, 1934 |
| 2,121,655 | Elsey | June 21, 1938 |
| 2,218,480 | Pray | Oct. 15, 1940 |
| 2,236,150 | Maltby | Mar. 25, 1941 |
| 2,304,499 | Hayes | Dec. 8, 1942 |
| 2,321,735 | Clifford | June 15, 1943 |
| 2,476,326 | Sherman | July 19, 1949 |

FOREIGN PATENTS

| Number | Country | Date |
|---|---|---|
| 264,900 | Great Britain | Jan. 21, 1927 |